United States Patent
Kakimoto et al.

(10) Patent No.: US 10,394,943 B2
(45) Date of Patent: Aug. 27, 2019

(54) NUMERICAL CONTROLLER

(71) Applicant: FANUC CORPORATION, Minamitsuru-gun, Yamanashi (JP)

(72) Inventors: Takashi Kakimoto, Yamanashi (JP); Mamoru Kubo, Yamanashi (JP); Koichi Murata, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 145 days.

(21) Appl. No.: 15/355,200

(22) Filed: Nov. 18, 2016

(65) Prior Publication Data

US 2017/0147548 A1     May 25, 2017

(30) Foreign Application Priority Data

Nov. 19, 2015 (JP) ................... 2015-226624

(51) Int. Cl.
*G06F 17/24* (2006.01)
*G06F 3/0484* (2013.01)
*G06F 9/451* (2018.01)

(52) U.S. Cl.
CPC ........ *G06F 17/241* (2013.01); *G06F 3/04842* (2013.01); *G06F 9/451* (2018.02)

(58) Field of Classification Search
None
See application file for complete search history.

(56) References Cited

U.S. PATENT DOCUMENTS

| 5,544,046 | A | 8/1996 | Niwa | |
| 8,826,116 | B2 * | 9/2014 | Martin | G06F 17/30887 |
| | | | | 715/230 |
| 2003/0081000 | A1 * | 5/2003 | Watanabe | G06F 17/241 |
| | | | | 715/751 |
| 2006/0020882 | A1 * | 1/2006 | Beezer | G06F 17/241 |
| | | | | 715/232 |
| 2011/0022942 | A1 * | 1/2011 | Flemings | G06F 17/30899 |
| | | | | 715/230 |
| 2012/0030558 | A1 * | 2/2012 | Chiu | G06F 17/241 |
| | | | | 715/233 |
| 2012/0064947 | A1 * | 3/2012 | Yi | G06F 3/0483 |
| | | | | 455/566 |
| 2012/0072866 | A1 * | 3/2012 | Imai | G06F 9/4443 |
| | | | | 715/804 |

(Continued)

FOREIGN PATENT DOCUMENTS

| JP | 05134734 A | 6/1993 |
| JP | 0778015 A | 3/1995 |

(Continued)

OTHER PUBLICATIONS

Notification of Reasons for Refusal for Japanese Application No. 2015-226624, dated Nov. 21, 2017 with translation, 5 pages.

*Primary Examiner* — Howard Cortes

(74) *Attorney, Agent, or Firm* — RatnerPrestia

(57) ABSTRACT

A numerical controller includes: a screen display section that displays a screen to which a screen identifier identifying a screen is added; an image storage section that stores, as image data, the screen displayed on the screen display section; a memo input section that adds memo data to the image data; and a memo management section that records the memo data and the screen identifier so as to be associated with each other.

5 Claims, 10 Drawing Sheets

(56) References Cited

U.S. PATENT DOCUMENTS

| | | | | |
|---|---|---|---|---|
| 2012/0174009 A1* | 7/2012 | Kwon | ................... | G06F 3/0481 |
| | | | | 715/768 |
| 2012/0210201 A1* | 8/2012 | Kim | ................. | H04M 1/72519 |
| | | | | 715/202 |
| 2012/0302167 A1* | 11/2012 | Yun | ..................... | G06F 3/04883 |
| | | | | 455/41.2 |
| 2014/0015782 A1* | 1/2014 | Kim | ................... | G06F 3/04883 |
| | | | | 345/173 |
| 2014/0089805 A1* | 3/2014 | Song | ....................... | G06F 3/167 |
| | | | | 715/727 |
| 2014/0164900 A1* | 6/2014 | Zeng | .................... | G06F 17/241 |
| | | | | 715/230 |
| 2016/0110035 A1* | 4/2016 | Kim | ..................... | G06F 3/0488 |
| | | | | 715/765 |

FOREIGN PATENT DOCUMENTS

| | | | |
|---|---|---|---|
| JP | 2004-148552 A | 5/2004 | |
| JP | 2007286960 A | 11/2007 | |

\* cited by examiner

FIG.3A

```
                                    MEMO    MEMO
                                  CREATION EXISTEN-
                                            CE 5

N1G1 X10.0
                    N2Y120.0
                    N3Z230.0

N4G0 X11.0
                    N5Y130.0
                    N6Z240.0

N7G1 X12.0
                    N8Y140.0
                    N9Z250.0

Machine
 X   240.000
 Y   -30.000
 Z   125.000

Absolute
 X    10.000
 Y   120.000
 Z   230.000
```

FIG.3B

```
                                    MEMO    MEMO
                                  CREATION EXISTEN-
                                            CE 5

N1G1 X10.0
                    N2Y120.0
                    N3Z2
                           1: O1 N100L10
                           2: O2 N102L2    N1005L101
                           3: O2 N102L3
                    N4G0   4: O121 N1005L101
                    N5Y1   5: O200 N10L15
                    N6Z2
                    N7G1 X12.0
                    N8Y140.0
                    N9Z250.0

Machine
 X   240.000
 Y   -30.000
 Z   125.000

Absolute
 X    10.000
 Y   120.000
 Z   230.000
```

FIG.3C

```
 MEMO    LINE ▬▬   COLOR ☐   TEXT    MOVE
 END

N1G1 X10.0
                    N2Y120.0
                    N3Z230.0 ← OVER
                              SPEED
                    N4G0 X11.0
                    N5Y130.0
                    N6Z240.0

N7G1 X12.0
                    N8Y140.0
                    N9Z250.0

Machine
 X   240.000
 Y   -30.000
 Z   125.000

Absolute
 X    10.000
 Y   120.000
 Z   230.000
```

FIG.3D

```
                                    MEMO    MEMO
                                  CREATION EXISTEN-
                                            CE 5

N1G1 X10.0
                    N2Y120.0
                    N3Z230.0

N4G0 X11.0
                    N5Y130.0
                    N6Z240.0

N7G1 X12.0
                    N8Y140.0
                    N9Z250.0

Machine
 X   240.000
 Y   -30.000
 Z   125.000

Absolute
 X    10.000
 Y   120.000
 Z   230.000
```

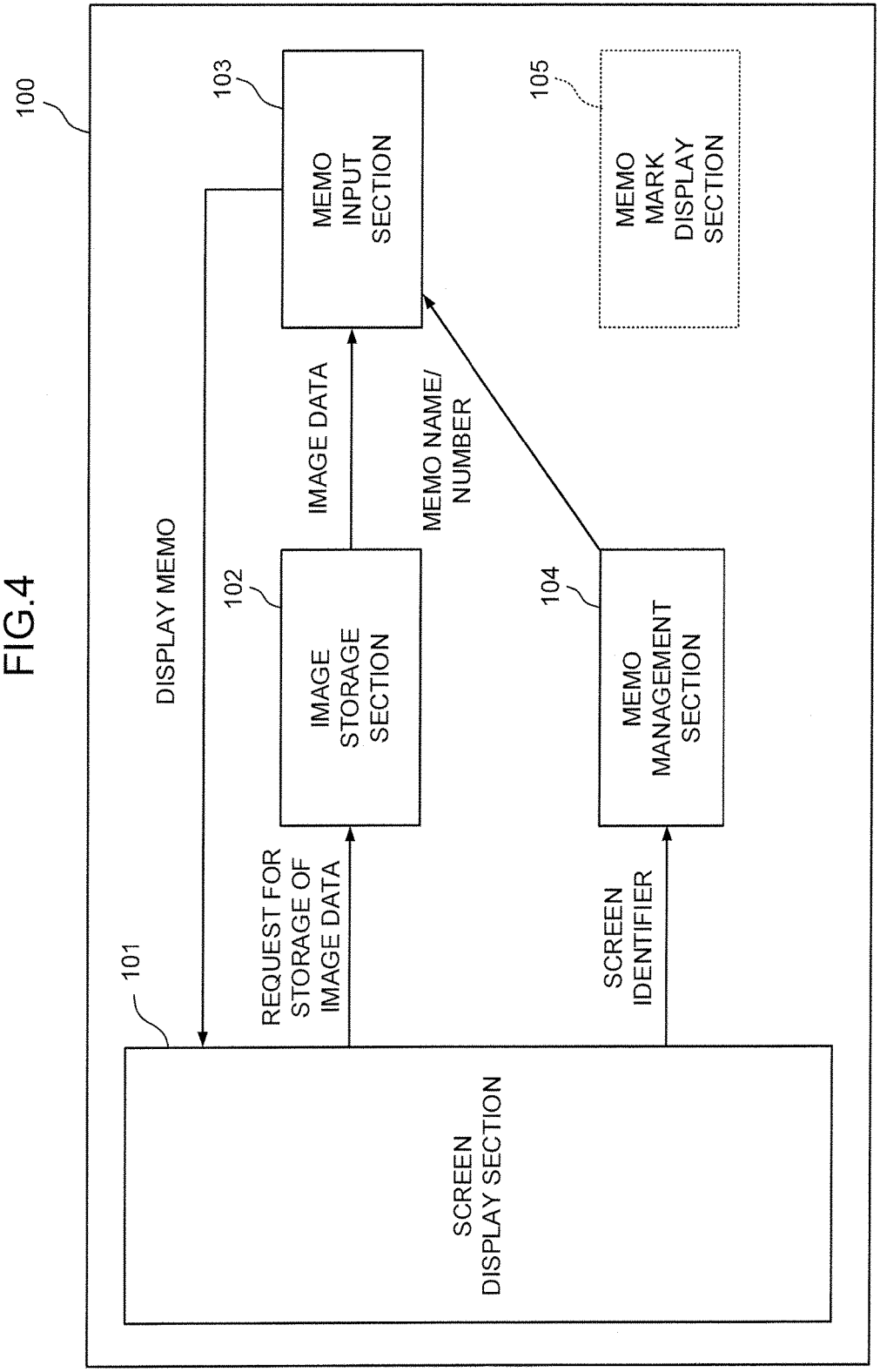

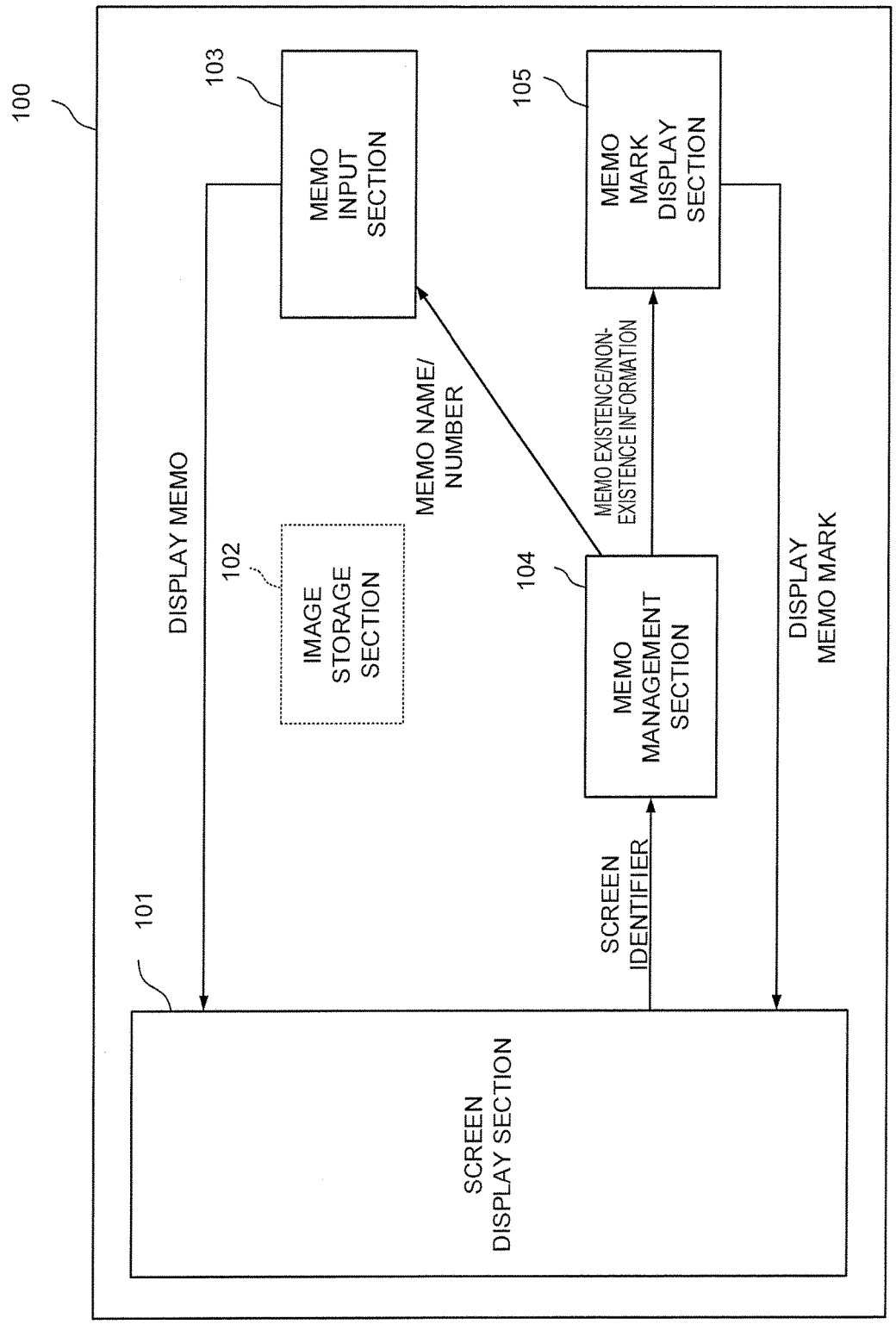

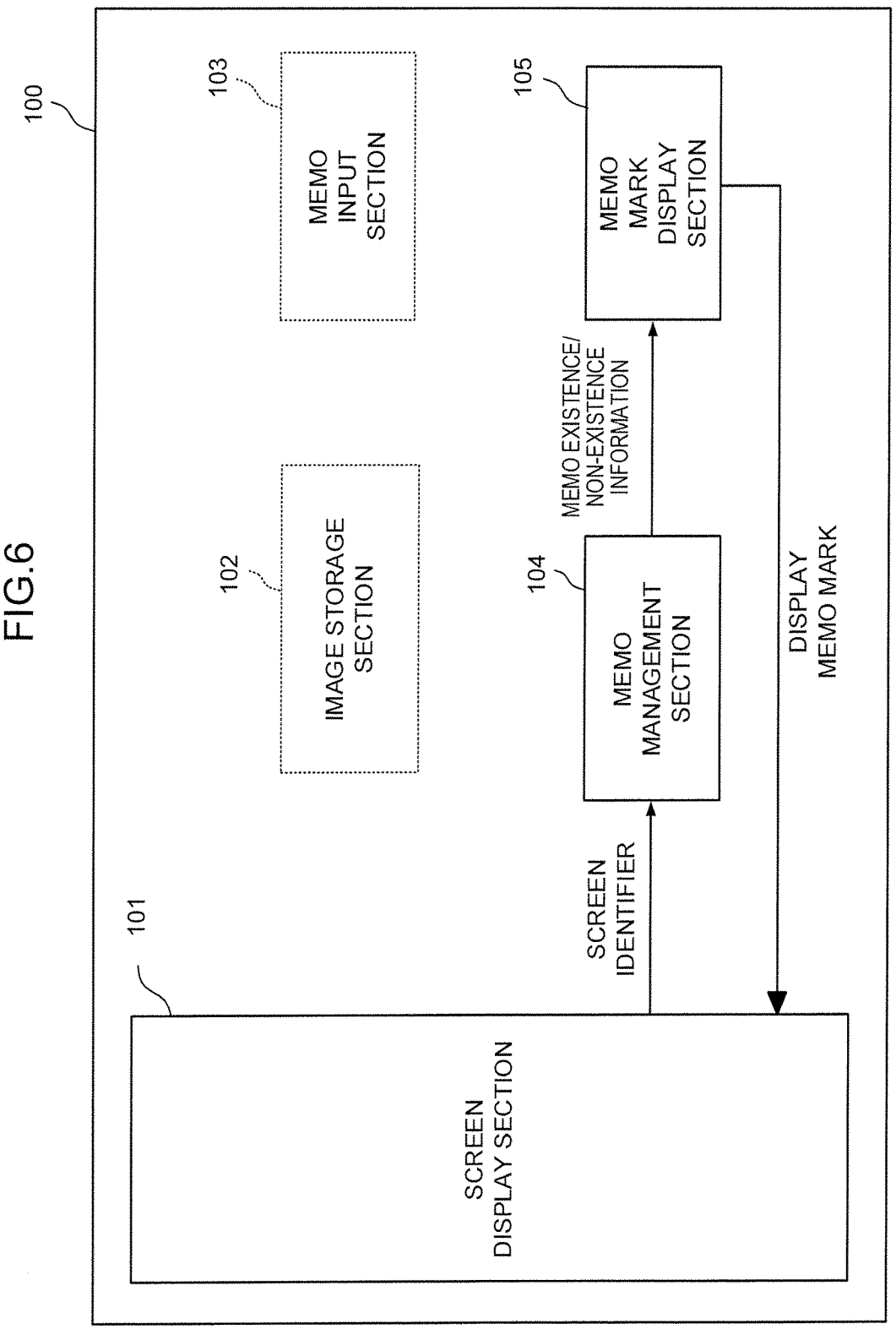

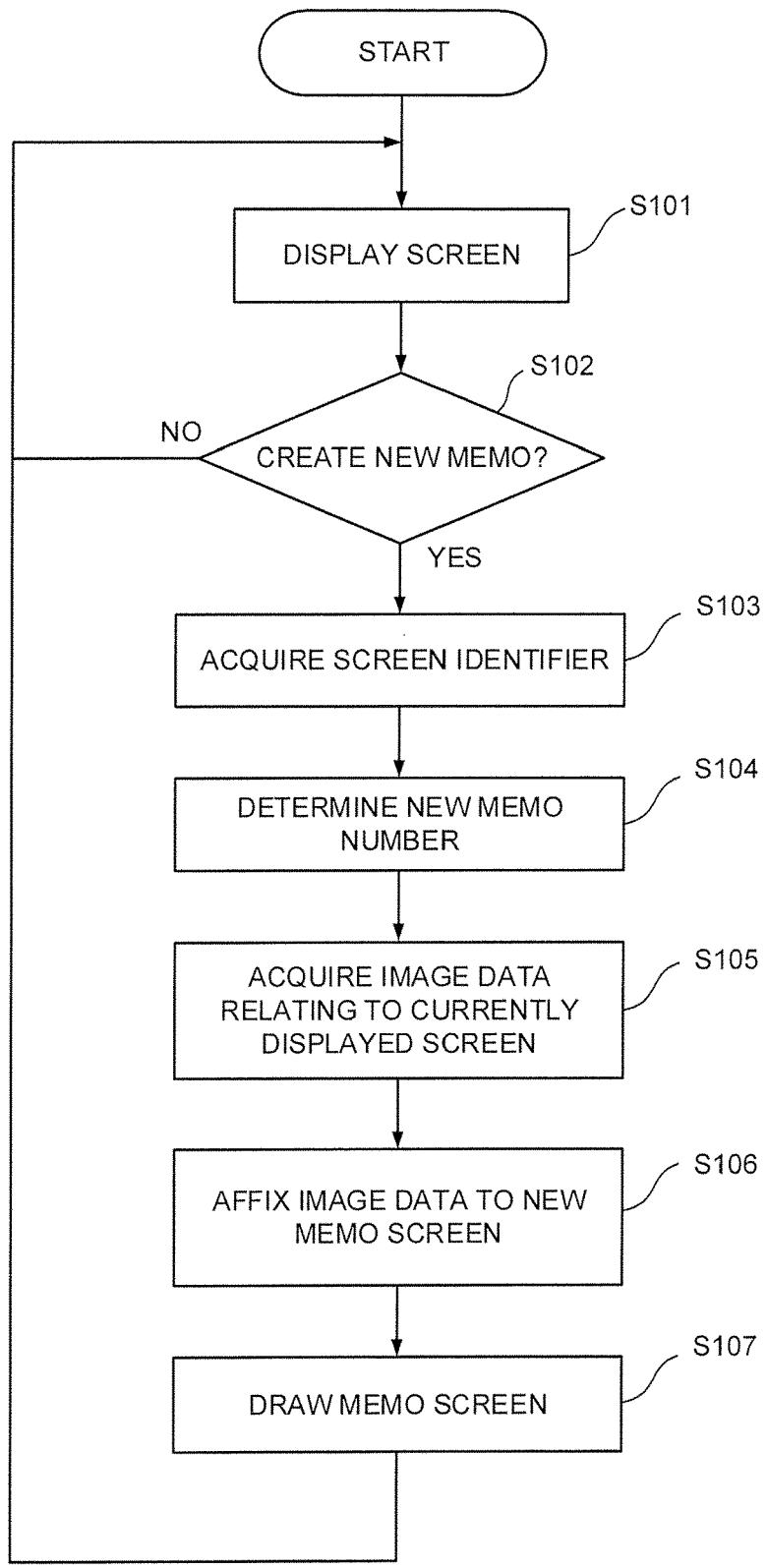

NUMERICAL CONTROLLER

BACKGROUND OF THE INVENTION

1. Field of the Invention

The present invention relates to a numerical controller equipped with a memo function.

2. Description of the Related Art

A machine tool performs machining according to a machining program of a numerical controller. In general, a machining program is created by a user's manual operation or using a CAD/CAM, and then, by repeatedly performing test cutting based on the machining program and correction of the machining program (debugging), a machine tool becomes capable of providing a complete machined product that satisfies the demanded specifications.

In conventional debugging, when a problem is found in checking the state of a workpiece inside a machine tool or the screen of a numerical controller, a part in the machining program corresponding to the problem is searched for and corrected manually. If a problem is found during debugging, since the numerical controller does not include any means on which one can write a memo about the state of the numerical controller or the part in the machining program corresponding to the problem, then a memo is left outside the numerical controller using a sticky note or a white board.

In this regard, as a method for recording information upon occurrence of a problem, a technology has been known for outputting a screen of a numerical controller in the form of image data. For example, Japanese Patent Application Laid-open No. 2004-148552 discloses a technology for converting image data on the display screen of an injection molding machine into a file format readable by a personal computer, and outputting the same.

However, the above known technology is based on the premise that image data on the display screen is output from a numerical controller to an outside to be used, and the technology does not indicate any method for handling such image data inside the numerical controller. In addition, the technology does not give any suggestion to specify, when a problem is found, the state of the numerical controller and the part of a machining program relating to the problem.

SUMMARY OF THE INVENTION

The present invention has been made in order to solve such a problem and has an object of providing a numerical controller capable of creating a memo including image data on the screen of the numerical controller and using the same inside the numerical controller.

According to an embodiment of the present invention, there is provided a numerical controller including: a screen display section that displays a screen to which a screen identifier identifying a screen is added; an image storage section that stores, as image data, the screen displayed on the screen display section; a memo input section that adds memo data to the image data; and a memo management section that records the memo data and the screen identifier so as to be associated with each other.

The numerical controller may further include: a memo mark display section that causes a mark to be displayed on the screen when the screen identifier of the screen displayed by the screen display section and the screen identifier associated with the memo data recorded by the memo management section match each other.

The memo mark display section may cause the number of the memo data, which is associated with the screen identifier matching the screen identifier of the screen displayed by the screen display section, to be displayed together with the mark.

The screen display section may further retain an under-execution position in a program displayed on the screen, and the memo management section may record the memo data, the screen identifier, and the under-execution position in the program so as to be associated with each other.

The numerical controller may further include: a cursor movement section that displays a screen indicated by the screen identifier associated with the memo data and moves a cursor to the under-execution position in the program associated with the memo data.

According to an embodiment of the present invention, it is possible to provide a numerical controller capable of creating a memo including image data relating to the screen of the numerical controller and using the same inside the numerical controller.

BRIEF DESCRIPTION OF THE DRAWINGS

The above and other objects and features of the present invention will become apparent from the descriptions of the following embodiments with reference to the accompanying drawings in which;

FIGS. 3A to 3D are diagrams each showing a screen example of the numerical controller according to a third embodiment of the present invention;

FIG. 4 is a diagram showing the configuration (the operation of creating a memo) of the numerical controller according to the first to third embodiments of the present invention;

FIG. 5 is a diagram showing the configuration (the operation of referring to a memo) of the numerical controller according to the first to third embodiments of the present invention;

FIG. 6 is a diagram showing the configuration (the operation of changing a screen) of the numerical controller according to the first to third embodiments of the present invention;

FIG. 7 is a flowchart for describing the operation of creating a memo by the numerical controller according to the first embodiment of the present invention;

DETAILED DESCRIPTION OF THE PREFERRED EMBODIMENTS

Figure 1A:
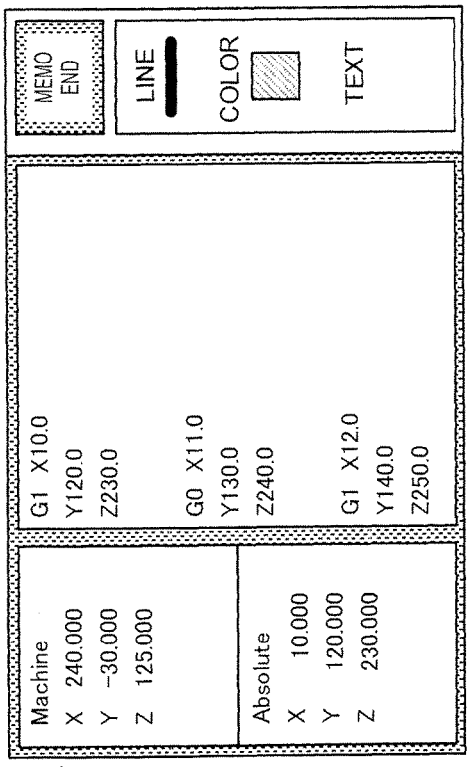
FIGS. 1A to 1D are diagrams each showing a screen example of a numerical controller according to a first embodiment of the present invention.

First, a description will be given, with reference to FIGS. 1A to 1D and FIGS. 4 to 9, of a numerical controller according to a first embodiment of the present invention.

A numerical controller 100 according to the embodiment stores a currently displayed screen and creates a memo associated with the screen.

As shown in FIGS. 4 to 6, the numerical controller 100 according to the embodiment has a screen display section 101, an image storage section 102, a memo input section 103, a memo management section 104, and a memo mark display section 105.

The screen display section 101 performs display control in respect of various screens such as a setting screen, a management screen, and an information display screen, and displays such screens on a display device. Each of the screens is assigned a unique screen identifier in advance, and the screen display section 101 retains the screen identifier of a currently displayed screen. For example, the screen display section 101 activates the image storage section 102 and the memo management section 104 as a "memo creation" button (FIG. 1A) provided on the screen is pressed.

The image storage section 102 generates image data relating to a screen currently being displayed on the screen display section 101.

The memo input section 103 generates memo data associated with image data generated by the image storage section 102. Typically, the memo input section 103 accepts the input of an object such as a text, a graphic, a free-form curve, and a freehand line to be written on image data generated by the image storage section 102 (FIG. 1B). When being input to the memo input section 103, such an object is displayed on the screen display section 101 by being superimposed on the image data (FIG. 1C). In addition, the memo input section 103 may stop the input of an object as a "memo end" button provided on the screen is pressed (FIG. 1C). The memo input section 103 generates memo data by associating image data and an input object with each other.

The memo management section 104 records the screen identifier of a screen displayed on the screen display section 101 and memo data generated by the memo input section 103 in association with the screen so as to be associated with each other. The memo management section 104 may generate a memo name or a memo number used to identify memo data and record the same so as to be associated with the memo data.

Figure 1C:
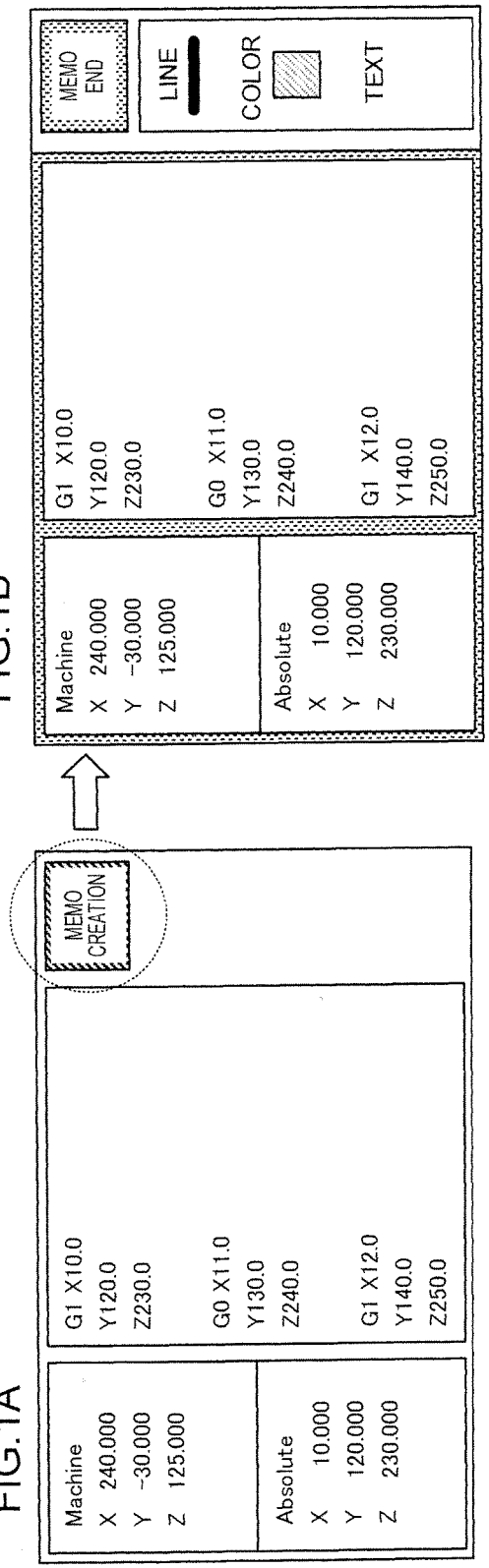
Figure 1B:
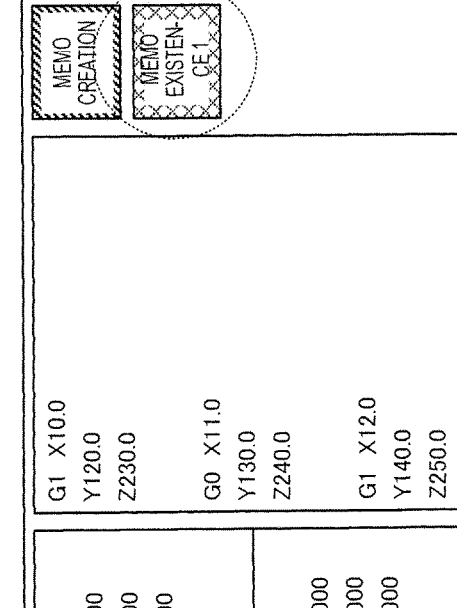
Figure 1D:
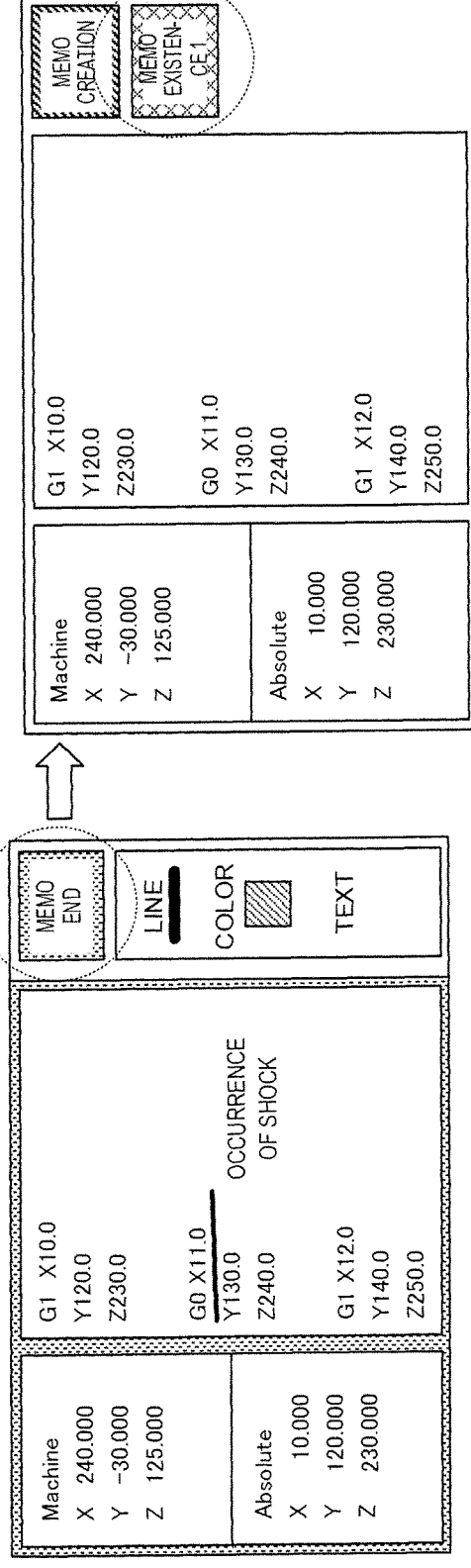

The memo mark display section 105 causes a mark indicating the existence of a memo, for example, a "memo existence" button, to be displayed on the screen when the screen identifier of a currently displayed screen and a screen identifier associated with stored memo data match each other (FIG. 1D). That is, when the memo management section 104 has recorded thereon memo data associated with the screen identifier of a currently displayed screen, the memo mark display section 105 causes the "memo existence" button to be displayed on the screen as shown in FIG. 1D. On the other hand, when the memo management section 104 has not recorded thereon the memo data associated with the screen identifier of the currently displayed screen, the memo mark display section 105 does not cause the "memo existence" button to be displayed on the screen as shown in FIG. 1A.

In addition, as the "memo existence" button is pressed, the memo mark display section 105 may activate the memo input section 103 and perform control to allow the edit of memo data recorded by the memo management section 104 and associated with the screen identifier of a currently displayed screen.

Next, a description will be given, with reference to the block diagram of FIG. 4 and the flowchart of FIG. 7, of the operation of creating a memo by the numerical controller 100. Hereinafter, the description will be given in line with each step of the flowchart.

(Step S101) The screen display section 101 displays the setting screen, the management screen, the information display screen, or the like of the numerical controller 100 on the display device (FIG. 1A). At this time, the screen display section 101 displays the "memo creation" button on the screen as a mark to create a memo.

(Step S102) The screen display section 101 determines whether or not the "memo creation" button on the screen has been pressed. When it is determined that the "memo creation" button has been pressed, the processing proceeds to step S103. On the other hand, when it is determined that the "memo creation" button has not been pressed, the processing returns to step S101 to continue image display processing.

(Step S103) The memo management section 104 acquires the screen identifier of a screen currently being displayed on the screen display section 101 from the screen display section 101.

(Step S104) The memo management section 104 newly generates a number to identify memo.

(Step S105) The image storage section 102 generates image data relating to the screen currently being displayed on the screen display section 101.

(Step S106) The memo input section 103 generates a new memo input screen. On the new memo input screen, the image data generated in step S105 is displayed. In addition, the new memo input screen provides a function to write an object such as a text, a graphic, a free-form curve, and a freehand line on the image data.

(Step S107) The memo input section 103 displays the new memo input screen generated in step S106 on the display device. In addition, the memo input section 103 accepts the input of an object such as a text, a graphic, a free-form curve, and a freehand line to be written on the image data (FIG. 1B). When being input to the memo input section 103, such an object is displayed on the screen display section 101 by being superimposed on the image data (FIG. 1C). Moreover, the memo input section 103 stops the display of the new memo input screen as the "memo end" button provided on the screen is pressed (FIG. 1C).

For example, the memo input section 103 generates memo data by associating the image data and the input object with each other as the "memo end" button is pressed.

The memo management section 104 records the screen identifier acquired in step S103, the memo number generated in step S104, and the memo data generated in step S107 so as to be associated with each other.

Figure 8:
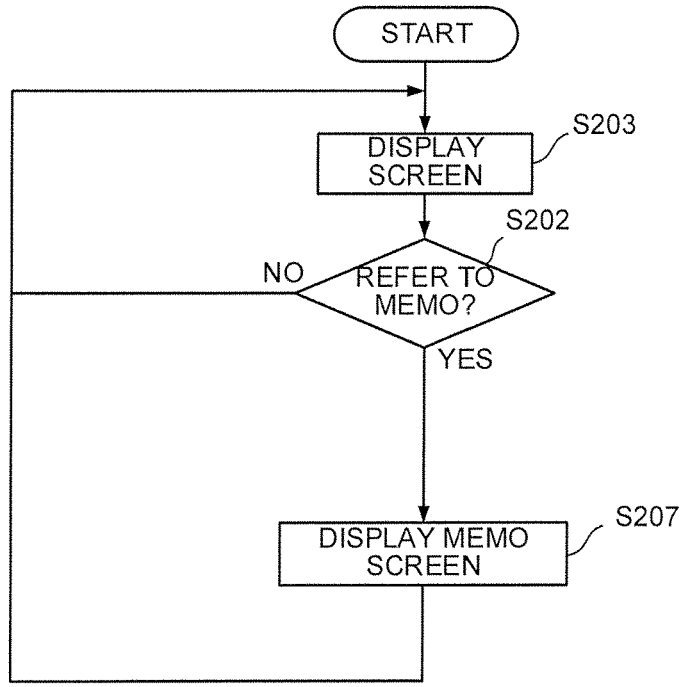
FIG. 8 is a flowchart for describing the operation of referring to a memo by the numerical controller according to the first embodiment of the present invention.

Next, a description will be given, with reference to the block diagram of FIG. 5 and the flowchart of FIG. 8, of the operation of referring to a memo by the numerical controller 100. Hereinafter, the description will be given in line with each step of the flowchart.

(Step S201) The screen display section 101 displays the setting screen, the management screen, the information display screen, or the like of the numerical controller 100 on the display device. At this time, the memo mark display section 105 causes the "memo existence" button to be displayed on the screen when the screen identifier of a currently displayed screen and a screen identifier associated with memo data recorded by the memo management section 104 match each other (FIG. 1D).

(Step S202) The memo mark display section 105 determines whether or not the "memo existence" button on the screen has been pressed. When it is determined that the "memo existence" button has been pressed, the processing proceeds to step S207. On the other hand, when it is determined that the "memo existence" button has not been pressed, the processing returns to step S201 to continue screen display processing.

(Step S207) The memo input section 103 acquires, from the memo management section 104, memo data associated with the screen identifier matching the screen identifier of the currently displayed screen among the memo data recorded by the memo management section 104, and causes the acquired memo data to be displayed on the display device. Preferably, the memo input section 103 allows data to be newly written in the memo data or the edit of an existing object.

Figure 9:
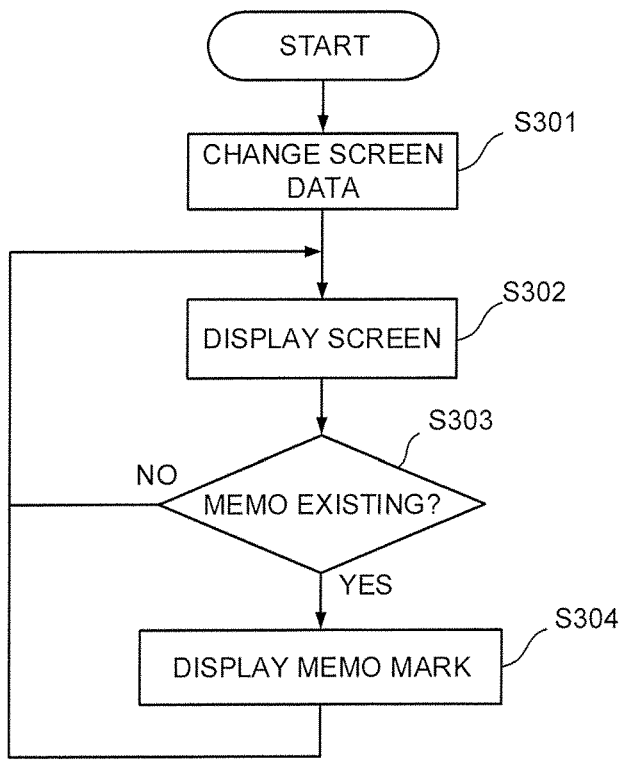
FIG. 9 is a flowchart for describing the operation of changing a screen by the numerical controller according to the first embodiment of the present invention.

Next, a description will be given, with reference to the block diagram of FIG. 6 and the flowchart of FIG. 9, of the operation of changing a screen by the numerical controller 100. Hereinafter, the description will be given in line with each step of the flowchart.

(Step S301) The screen display section 101 changes the type of a screen displayed on the display device of the numerical controller 100 according to user's input or prescribed control. At this time, the screen display section 101 also updates the retaining screen identifier of a currently displayed screen to a screen identifier corresponding to the type of a screen to be newly displayed.

(Step S302) The screen display section 101 displays the screen changed in step S301 on the display device of the numerical controller 100.

(Step S303) The memo mark display section 105 determines whether or not the screen identifier of the screen changed in step S301 and a screen identifier associated with memo data recorded by the memo management section 104 match each other. When memo data with the matching screen identifier exists, the processing proceeds to step S304. On the other hand, when the memo data with the matching screen identifier does not exist, the processing returns to step S302 to continue screen display processing.

(Step S304) The memo mark display section 105 causes the "memo existence" button to be displayed on the screen (FIG. 1D).

The numerical controller 100 according to the embodiment is allowed to store a currently displayed screen and create a memo associated with the screen as the "memo creation" button is pressed. Thus, the numerical controller 100 is allowed to immediately record the state of the numerical controller when a problem occurs during debugging or the like, and improve the efficiency of debugging.

In addition, when a memo corresponding to a currently displayed screen has been created, the numerical controller 100 according to the embodiment displays a memo mark on the screen. In a case in which a memo corresponding to a newly displayed screen exists when a screen is changed, the numerical controller 100 displays a memo mark on the screen. Thus, the numerical controller 100 is allowed to inform a user of the existence of a memo corresponding to a currently displayed screen and improve the efficiency of debugging.

Next, a description will be given, with reference to FIGS. 2A and 2B and FIGS. 10 and 11, of the numerical controller according to a second embodiment of the present invention.

The numerical controller 100 according to the second embodiment is allowed to create a plurality of memos corresponding to a screen.

The numerical controller 100 according to the second embodiment is common to the numerical controller 100 according to the first embodiment in the constituents as shown in the block diagrams of FIG. 4 (showing the operation of creating a memo), FIG. 5 (showing the operation of referring to a memo), and FIG. 6 (showing the operation of changing a screen), but is different from the numerical controller 100 according to the first embodiment in the following points.

Figure 2A:
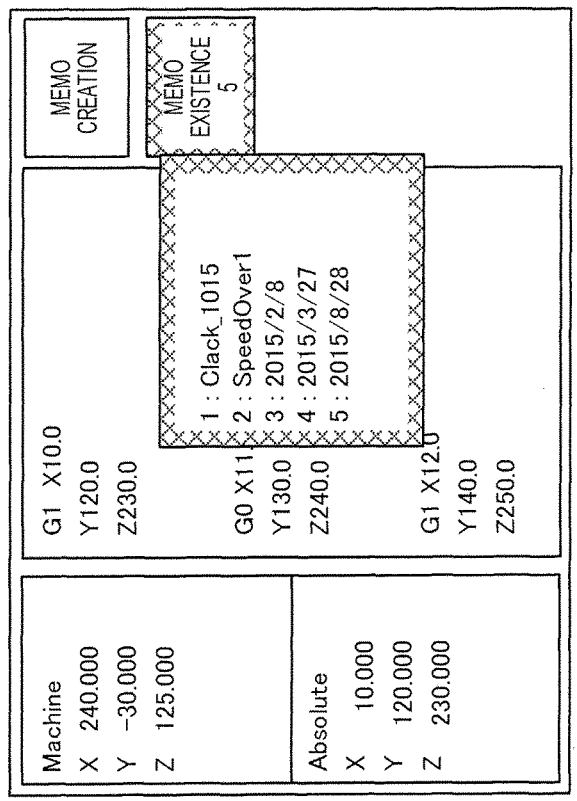
FIGS. 2A and 2B are diagrams each showing a screen example of the numerical controller according to a second embodiment of the present invention.
Figure 2B:
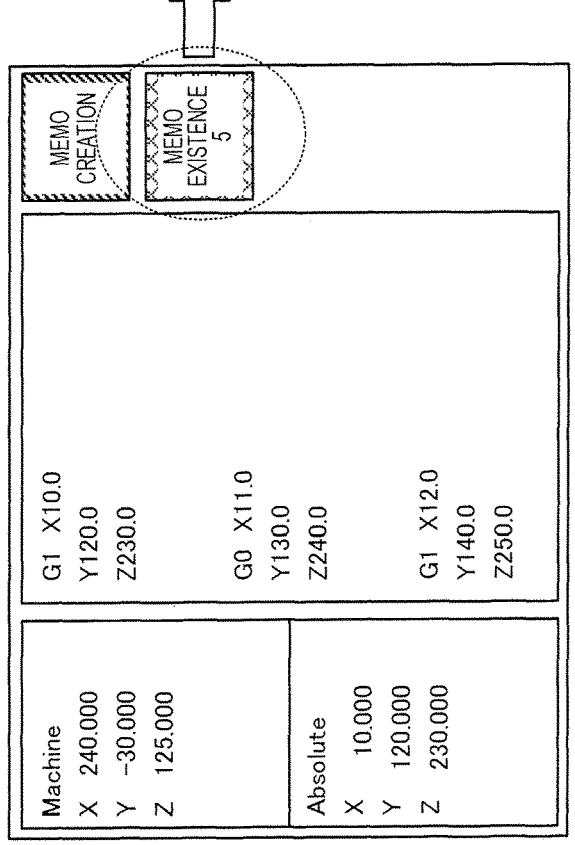

The memo mark display section 105 causes the number of memos, which is associated with the screen identifier of a currently displayed screen recorded by the memo management section 104, to be displayed together with the "memo existence" button (FIG. 2A). In addition, the memo mark display section 105 causes a list of the memo names or the memo numbers of memos, which is associated with the screen identifier of a currently displayed screen, to be displayed as the "memo existence" button is pressed (FIG. 2B). Moreover, according to user's input to select any memo from the list of the memos, the memo mark display section 105 may activate the memo input section 103 and perform control to allow the edit of memo data relating to the selected memo.

Figure 10:
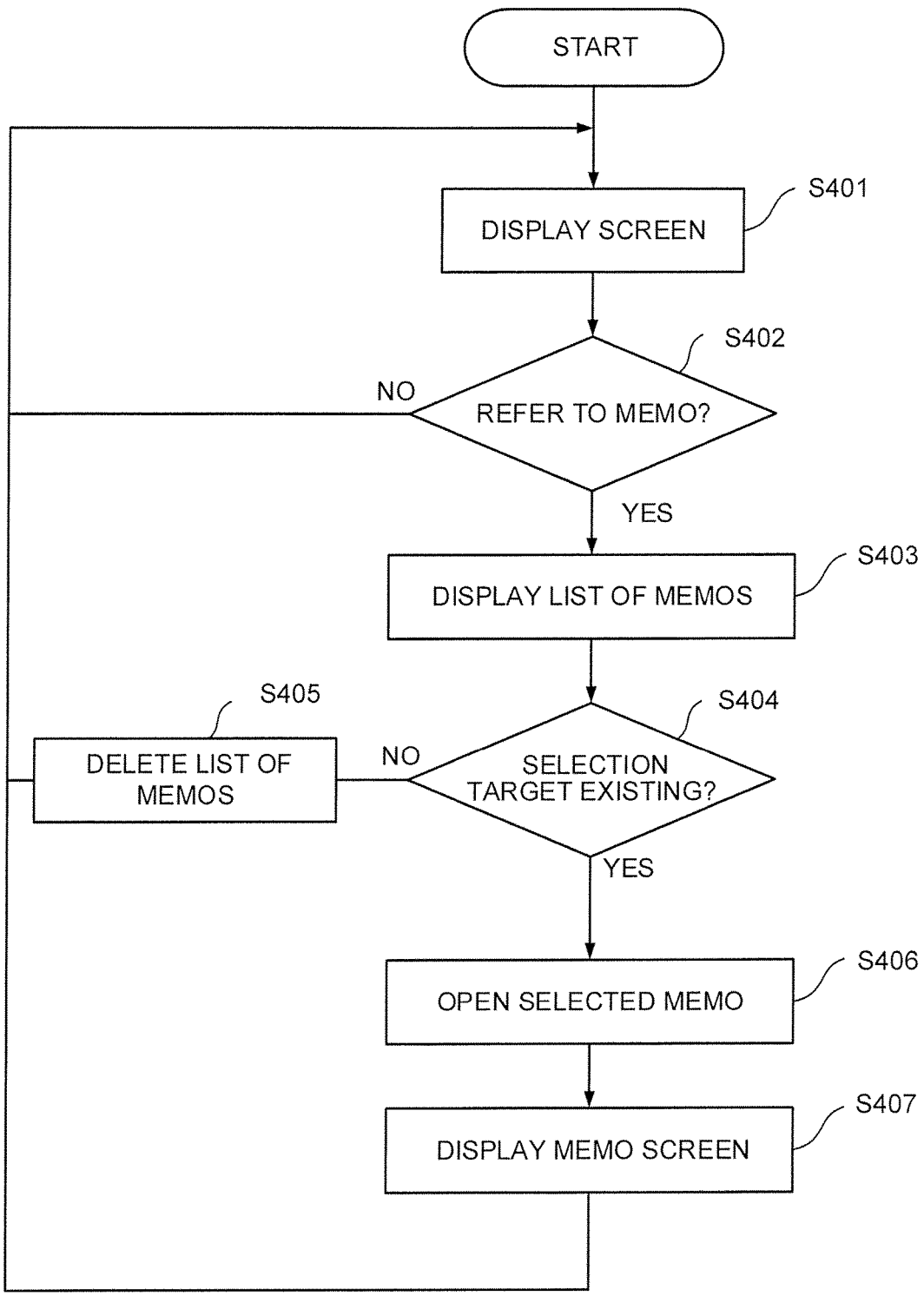
FIG. 10 is a flowchart for describing the operation of referring to a memo by the numerical controller according to the second embodiment of the present invention.

Next, a description will be given, with reference to the block diagram of FIG. 5 and the flowchart of FIG. 10, of the operation of referring to a memo by the numerical controller 100. Hereinafter, the description will be given in line with each step of the flowchart.

(Step S401) The screen display section 101 displays the setting screen, the management screen, the information display screen, or the like of the numerical controller 100 on the display device. When the screen identifier of a currently displayed screen and a screen identifier associated with memo data recorded by the memo management section 104 match each other, the memo mark display section 105 causes the "memo existence" button to be displayed on the screen. At this time, when a plurality of matching memo data exists, the memo mark display section 105 also causes the number of the matching memo data to be displayed (FIG. 2A).

(Step S402) The memo mark display section 105 determines whether or not the "memo existence" button on the screen has been pressed. When it is determined that "memo existence" button on the screen has been pressed, the processing proceeds to step S403, and when it is determined that the "memo existence" button has not been pressed, the processing returns to step S401 to continue screen display processing.

(Step S403) The memo mark display section 105 causes a list of the memo names or the memo numbers of memo data, which is associated with screen identifiers matching the screen identifier of a currently displayed screen among the memo data recorded by the memo management section 104, to be displayed (FIG. 2B).

(Step S404) The memo mark display section 105 determines whether or not any memo has been selected from the list of the memos displayed in step S403. When it is determined that any memo has been selected from the list of the memos, the processing proceeds to step S406. On the other hand, when it is determined that no memo has been selected from the list of the memos, the processing proceeds to step S405.

(Step S405) The memo mark display section 105 stops the display of the list of the memos and the processing returns to step S401 to continue image display processing.

(Step S406) The memo mark display section 105 activates the memo input section 103 and performs control to allow the edit of the memo selected in step S404.

(Step S407) The memo input section 103 acquires, from the memo management section 104, the memo data having the memo name or the memo number selected in step S404, and causes the acquired memo data to be displayed on the display device. Preferably, the memo input section 103 allows data to be newly written in the memo data or the edit of an existing object.

Figure 11:
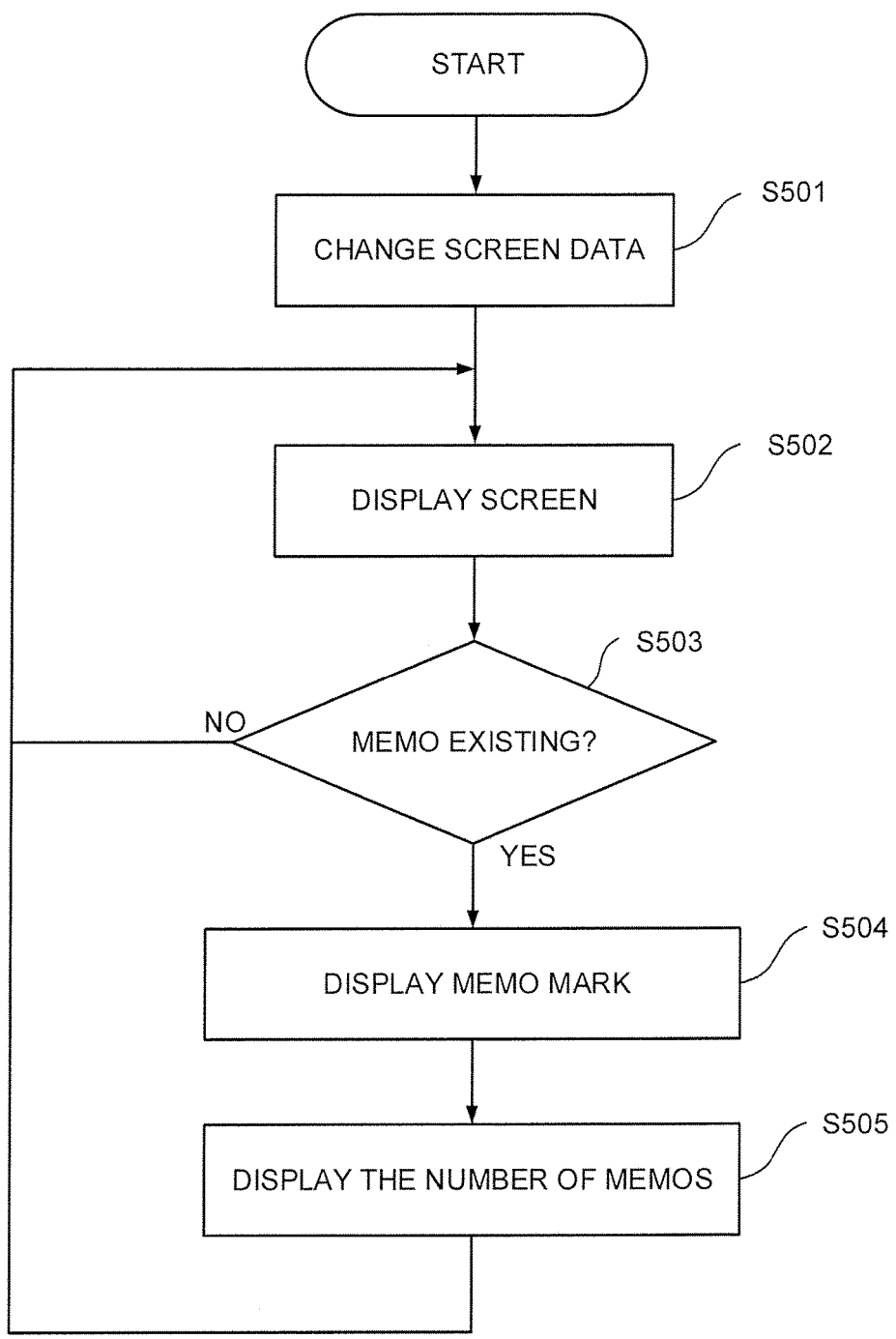
FIG. 11 is a flowchart for describing the operation of changing a screen by the numerical controller according to the second embodiment of the present invention.

Next, a description will be given, with reference to the block diagram of FIG. 6 and the flowchart of FIG. 11, of the operation of changing a screen by the numerical controller 100. Hereinafter, the description will be given in line with each step of the flowchart.

(Step S501) The screen display section 101 changes the type of a screen displayed on the display device of the numerical controller 100 according to user's input or prescribed control. At this time, the screen display section 101 also updates the retaining screen identifier of a currently displayed screen to a screen identifier corresponding to the type of a screen to be newly displayed.

(Step S502) The screen display section 101 displays the screen changed in step S501 on the display device of the numerical controller 100.

(Step S503) The memo mark display section 105 determines whether or not the screen identifier of the screen changed in step S501 and a screen identifier associated with memo data recorded by the memo management section 104 match each other. When memo data with the matching screen identifier exists, the processing proceeds to step S504. On the other hand, when the memo data with the matching screen identifier does not exist, the processing returns to step S502 to continue screen display processing.

(Step S504) The memo mark display section 105 causes the "memo existence" button to be displayed on the screen.

(Step S505) When a plurality of memo data with the matching screen identifier is found in the processing of step S503, the memo mark display section 105 causes the number of the matching memo data to be displayed together with the "memo existence" button (FIG. 2A).

Note that since the operation of creating a memo by the numerical controller according to the second embodiment is the same as the operation of creating a memo by the numerical controller according to the first embodiment described above with reference to FIGS. 4 and 7, its description will be omitted.

According to the second embodiment, the numerical controller 100 is allowed to create a plurality of memos associated with a currently displayed screen. In addition, the numerical controller 100 is allowed to easily handle a plurality of memos by causing the number of the memos to be displayed on the screen.

Next, a description will be given, with reference to FIGS. 3A to 3D, of the numerical controller according to a third embodiment of the present invention.

The numerical controller 100 according to the third embodiment creates, manages, and edits a plurality of memos on a screen.

The numerical controller 100 according to the third embodiment is common to the numerical controller 100 according to the above first and second embodiments in the constituents as shown in the block diagrams of FIG. 4 (showing the operation of creating a memo), FIG. 5 (showing the operation of referring to a memo), and FIG. 6 (showing the operation of changing a screen), but is different from the numerical controller 100 according to the first and second embodiments in the following points.

For example, when the numerical controller 100 causes a list of running programs to be displayed on the display device, the screen display section 101 retains information specifying a currently-executing position in a program (shown by, for example, a hatched row in FIG. 3A) besides the screen identifier of a currently displayed screen.

The memo management section 104 records the screen identifier of a screen displayed on the screen display section 101, information specifying a currently-executing position in a program, and memo data generated by the memo input section 103 in association with the screen in a manner such that they are associated with each other.

The memo input section 103 creates memo data associated with image data generated by the image storage section 102 and a position in a program under execution at that time. On a memo input screen, a under-execution position in a program may be highlighted on image data (FIG. 3C). In addition, the memo input section 103 may perform, as a "movement" button provided on a screen is pressed, control to display a screen indicated by a screen identifier associated with memo data (FIG. 3C) and move a cursor to information specifying the position in the program associated with the memo data (FIG. 3D).

The numerical controller 100 according to the third embodiment records a currently displayed screen and a currently-executing position in a program in association with memo data. In addition, the numerical controller 100 is allowed to move, based on a created memo, a cursor to the position in a program associated with the memo. Thus, the numerical controller 100 is allowed to improve the efficiency of debugging for a program.

Note that the present invention is not limited to the above first to third embodiments but may be appropriately modified without departing from its scope. For example, the numerical controller 100 according to the first embodiment performs the processing in the order of the acquisition of a screen identifier, the generation of a memo number, the generation of image data, and the recording of memo data. However, the present invention is not limited to this order. The above processing may be performed precedently in any order so long as the memo management section 104 is allowed to record an image identifier, a memo number, and memo data so as to be associated with each other. The same applies to the second and third embodiments.

In addition, the numerical controller according to the third embodiment handles information specifying the position in program being currently executed besides the screen identifier of a currently displayed screen. The method is also applicable to, for example, a case in which a certain type of a screen specified by a screen identifier has a plurality of pages or sub-screens. That is, instead of the above information specifying the position in a program, information specifying pages or information specifying sub-screens is used. Thus, it becomes possible to associate memo data with information specifying pages or sub-screens, or move from memo data to specific pages or sub-screens.

The invention claimed is:
1. A numerical controller comprising:
a processor configured to:
control a display device to display image data including a machining program code for controlling a machine tool, the image data associated with a screen identifier;
perform debugging of the machining program code;
control a memory device to store the image data displayed on the display device;
receive a plurality of memo data and add the plurality of memo data to the image data during the debugging, each of the plurality of the memo data associ- ated with a respective memo identifier and an under-execution position of the machining program code during the debugging;

record, in the memory device, the plurality of memo data;

associate the plurality of memo data and each respective memo identifier with the screen identifier;

display the plurality of memo data, the under-execution position of the machining program code during the debugging and each respective memo identifier in a state where they are associated with the screen identifier; and control the machine tool based on the machining program code.

2. The numerical controller according to claim 1, further comprising:

a memo mark display section that causes a mark to be displayed on the screen when the screen identifier of the screen displayed by the screen display section and the screen identifier associated with the memo data recorded by the memo management section match each other.

3. The numerical controller according to claim 2, wherein the memo mark display section causes the number of the memo data, which is associated with the screen identifier matching the screen identifier of the screen displayed by the screen display section, to be displayed together with the mark.

4. The numerical controller according to claim 1, wherein the screen display section further retains an under-execution position in a program displayed on the screen, and the memo management section records the memo data, the screen identifier, and the under-execution position in the program so as to be associated with each other.

5. The numerical controller according to claim 4, further comprising:

a cursor movement section that displays a screen indicated by the screen identifier associated with the memo data and moves a cursor to the under-execution position in the program associated with the memo data.

* * * * *